United States Patent
Xu et al.

(10) Patent No.: US 11,636,143 B2
(45) Date of Patent: Apr. 25, 2023

(54) ENTITY SEARCH METHOD, RELATED DEVICE, AND COMPUTER STORAGE MEDIUM

(71) Applicants: Huawei Technologies Co., Ltd., Shenzhen (CN); THE BOARD OF TRUSTEES OF THE UNIVERSITY OF ILLINOIS, Urbana, IL (US)

(72) Inventors: Chuanfei Xu, Shenzhen (CN); Yi Chang, Shenzhen (CN); Mingzhen Xia, Hangzhou (CN); Yueguo Chen, Urbana, IL (US); Denghao Ma, Urbana, IL (US); Kevin Chang, Urbana, IL (US)

(73) Assignees: Huawei Technologies Co., Ltd., Shenzhen (CN); THE BOARD OF TRUSTEES OF THE UNIVERSITY OF ILLINOIS

( * ) Notice: Subject to any disclaimer, the term of this patent is extended or adjusted under 35 U.S.C. 154(b) by 139 days.

(21) Appl. No.: 17/093,210

(22) Filed: Nov. 9, 2020

(65) Prior Publication Data
US 2021/0056130 A1    Feb. 25, 2021

Related U.S. Application Data

(63) Continuation of application No. PCT/CN2019/086197, filed on May 9, 2019.

(30) Foreign Application Priority Data

May 9, 2018    (CN) .......................... 201810440583.8

(51) Int. Cl.
G07F 17/00    (2006.01)
G06F 16/35    (2019.01)
(Continued)

(52) U.S. Cl.
CPC .......... *G06F 16/355* (2019.01); *G06F 16/334* (2019.01); *G06F 16/36* (2019.01)

(58) Field of Classification Search
None
See application file for complete search history.

(56) References Cited

U.S. PATENT DOCUMENTS 9,785,717 B1 *  10/2017  DeLuca ................ G06F 16/248
10,936,680 B2 *  3/2021  DeLuca ............. G06F 16/9535
(Continued)

FOREIGN PATENT DOCUMENTS

CN    102063468 A    5/2011
CN    102902806 A    1/2013
(Continued)

*Primary Examiner* — Debbie M Le
(74) *Attorney, Agent, or Firm* — Leydig, Voit & Mayer, Ltd.

(57) ABSTRACT

An entity search method, a related device, and a computer storage medium are provided. The method includes: determining a first classifier and a second classifier that are included in query information; determining, based on a first entity library and the first classifier and the second classifier that are included in the query information, s correlations corresponding to each of w candidate entities, wherein information about the candidate entity includes a third classifier and a fourth classifier, and the correlation indicates a correlation between the classifiers in the query information and the classifiers in the candidate entity; and determining, based on the s correlations corresponding to each of the w candidate entities, information about a target entity corresponding to the query information, wherein the target entity is an entity in the w candidate entities.

20 Claims, 4 Drawing Sheets

(51) Int. Cl.
*G06F 16/33* (2019.01)
*G06F 16/36* (2019.01)

(56) References Cited

U.S. PATENT DOCUMENTS

| | | | |
|---|---|---|---|
| 11,157,564 B2* | 10/2021 | Prakash | ............... G06N 5/04 |
| 2009/0254527 A1 | 10/2009 | Jung et al. | |
| 2014/0280050 A1 | 9/2014 | Hadatsuki et al. | |

FOREIGN PATENT DOCUMENTS

| | | |
|---|---|---|
| CN | 103064838 A | 4/2013 |
| CN | 103970761 A | 8/2014 |
| CN | 104102723 A | 10/2014 |
| CN | 105956137 A | 9/2016 |
| CN | 105975596 A | 9/2016 |
| CN | 106033466 A | 10/2016 |
| CN | 107133259 A | 9/2017 |
| CN | 107330120 A | 11/2017 |
| JP | 2004005103 A | 1/2004 |

\* cited by examiner

ENTITY SEARCH METHOD, RELATED DEVICE, AND COMPUTER STORAGE MEDIUM

CROSS-REFERENCE TO RELATED APPLICATIONS

This application is a continuation of International Patent Application No. PCT/CN2019/086197, filed on May 9, 2019, which claims priority to Chinese Patent Application No. 201810440583.8, filed on May 9, 2018. The disclosures of the aforementioned applications are hereby incorporated by reference in their entireties.

TECHNICAL FIELD

Embodiments of the present invention relate to the field of Internet technologies, and in particular, to an entity search method, a related device, and a computer storage medium.

BACKGROUND

With development of the Internet, a size of text data becomes increasingly large. An early search engine mainly performs text-based searches, and particularly, uses a keyword-based matching search method. However, the search method lacks deep understanding of a word meaning, and a matching degree is relatively low. In addition, a feedback result is displayed in a text form, and a user needs to search for an answer from the feedback text, resulting in poor user experience.

To resolve the foregoing problem, an entity search method is currently proposed, to search for an entity (a result answer) queried by a user and display the entity to the user. In practice, it is found that the current entity search method is also mainly used to perform keyword-based matching searches. In a keyword matching solution, matching succeeds only when a query keyword is consistent with an entity keyword. Therefore, matching fails for most synonyms, that is, matching fails for words with same or similar expressions. It can be learned that, in an actual search process, because different users have different expressions of a same object, which is also referred to as a conceptual gap, a matching rate or accuracy of a search is relatively low.

SUMMARY

Embodiments of the present invention disclose an entity search method, a related device, and a computer storage medium, to resolve a prior-art problem that a result search has a relatively low matching rate, relatively low accuracy, or the like due to a conceptual gap.

According to a first aspect, an embodiment of the present invention provides an entity search method. The method includes:

determining, by a terminal device, a first classifier and a second classifier that are included in query information, where the first classifier is a word that is in the query information and that represents a type of a query result, and the second classifier is a word in the query information other than the first classifier;

determining, based on a first entity library and the first classifier and the second classifier that are included in the query information, s correlations corresponding to each of w candidate entities, where the first entity library includes information about each of the w candidate entities, the information about the candidate entity includes a third classifier and a fourth classifier, the third classifier and the first classifier belong to a same classification, the fourth classifier and the second classifier belong to a same classification, the correlation is used to indicate a correlation between the classifiers in the query information and the classifiers in the candidate entity, both w and s are positive integers, and s is less than or equal to 4; and determining, based on the s correlations corresponding to each of the w candidate entities, information about a target entity corresponding to the query information, where the target entity is an entity in the w candidate entities.

In some possible embodiments, the first classifier includes a corresponding core word that is in the query information and that represents the type of the query result, and the second classifier includes a modifier in the query information other than the first classifier and a stop word.

In some possible embodiments, the s correlations include a first correlation, used to indicate a correlation between the first classifier in the query information and the third classifier in the candidate entity; and the determining, based on a first entity library and the first classifier and the second classifier that are included in the query information, s correlations corresponding to each of w candidate entities includes:

performing classification processing on the w candidate entities in the first entity library, to obtain a processed candidate entity, where the classification processing is combining candidate entities corresponding to third classifiers that express same or similar word meanings into a processed candidate entity; and determining, based on the first classifier in the query information and a third classifier in the processed candidate entity, a first correlation corresponding to each of the w candidate entities.

In some possible embodiments, the s correlations include a second correlation, used to indicate a correlation between the first classifier in the query information and the fourth classifier in the candidate entity; and the determining, based on a first entity library and the first classifier and the second classifier that are included in the query information, s correlations corresponding to each of w candidate entities includes any one of the following:

determining, based on a processed first classifier in the query information and the fourth classifier included in each of the w candidate entities, a correlation a corresponding to each of the w candidate entities, and using the correlation a as a second correlation corresponding to each of the w candidate entities;

determining, based on the first classifier in the query information and a processed fourth classifier included in each of the w candidate entities, a correlation b corresponding to each of the w candidate entities, and using the correlation b as a second correlation corresponding to each of the w candidate entities; and determining, based on a correlation a corresponding to each of the w candidate entities and a correlation b corresponding to each of the w candidate entities, a second correlation corresponding to each of the w candidate entities, where the processed first classifier is obtained by performing context association processing on the first classifier in the query information based on a first pre-stored document, the processed fourth classifier is obtained by performing, based on the first pre-stored document, context association processing on the fourth classifier included in the candidate entity, the context association processing is extracting, from the first pre-stored document, the first i words and/or the last j words that are close to the first classifier or the fourth classifier, and both i and j are positive integers.

In some possible embodiments, the correlation a or the correlation b is determined based on a correlation smoothing algorithm, and the correlation smoothing algorithm is used to reduce a degree of a deviation, in the first pre-stored document, of the first classifier in the query information or the fourth classifier in the candidate entity.

In some possible embodiments, the s correlations include a third correlation, used to indicate a correlation between the second classifier in the query information and the third classifier in the candidate entity; and the determining, based on a first entity library and the first classifier and the second classifier that are included in the query information, s correlations corresponding to each of w candidate entities includes any one of the following:

determining, based on a processed second classifier in the query information and the third classifier included in each of the w candidate entities, a correlation c corresponding to each of the w candidate entities, and using the correlation c as a third correlation corresponding to each of the w candidate entities;

determining, based on the second classifier in the query information and a processed third classifier included in each of the w candidate entities, a correlation d corresponding to each of the w candidate entities, and using the correlation d as a third correlation corresponding to each of the w candidate entities; and determining, based on a correlation c corresponding to each of the w candidate entities and a correlation d corresponding to each of the w candidate entities, a third correlation corresponding to each of the w candidate entities, where the processed second classifier is obtained by performing context association processing on the second classifier in the query information based on a second pre-stored document, the processed third classifier is obtained by performing, based on the second pre-stored document, context association processing on the third classifier included in the candidate entity, the context association processing is extracting, from the second pre-stored document, the first k words and/or the last l words that are close to the second classifier or the third classifier, and both k and l are positive integers.

In some possible embodiments, the correlation c or the correlation d is determined based on a correlation smoothing algorithm, and the correlation smoothing algorithm is used to reduce a degree of a deviation, in the second pre-stored document, of the second classifier in the query information or the third classifier in the candidate entity.

In some possible embodiments, the s correlations include a fourth correlation, used to indicate a correlation between the second classifier in the query information and the fourth classifier in the candidate entity; and the determining, based on a first entity library and the first classifier and the second classifier that are included in the query information, s correlations corresponding to each of w candidate entities includes any one of the following:

determining, based on an extended second classifier in the query information and the fourth classifier included in each of the w candidate entities, a correlation e corresponding to each of the w candidate entities, and using the correlation e as a fourth correlation corresponding to each of the w candidate entities;

determining, based on the second classifier in the query information and an extended fourth classifier included in each of the w candidate entities, a correlation f corresponding to each of the w candidate entities, and using the correlation f as a fourth correlation corresponding to each of the w candidate entities; and determining, based on a correlation e corresponding to each of the w candidate entities and a correlation f corresponding to each of the w candidate entities, a fourth correlation corresponding to each of the w candidate entities, where the extended second classifier is obtained by extending an attribute word for the second classifier in the query information, and the extended fourth classifier is obtained by extending an attribute word for the fourth classifier in the candidate entity.

In some possible embodiments, the determining, based on the s correlations corresponding to each of the w candidate entities, information about a target entity corresponding to the query information includes:

determining, based on the s correlations corresponding to each of the w candidate entities, a target correlation corresponding to each of the w candidate entities; and determining, based on the target correlation corresponding to each of the w candidate entities, the information about the target entity corresponding to the query information, where the target entity is a corresponding entity that is in the w candidate entities and that has a target correlation greater than or equal to a first threshold.

According to a second aspect, an embodiment of the present invention provides a terminal device, including corresponding functional units configured to perform the method described in the first aspect.

According to a third aspect, an embodiment of the present invention provides another terminal device, including a memory and a processor coupled to the memory. The memory is configured to store an instruction. The processor is configured to execute the instruction and communicate with a first camera and a second camera. When executing the instruction, the processor performs the method described in the first aspect.

In some possible embodiments, the terminal device further includes a display coupled to the processor, and the display is configured to display information (a search result) about a target entity under control of the processor.

In some possible embodiments, the terminal device further includes a communications interface. The communications interface communicates with the processor, and the communications interface is configured to communicate with another device (for example, a network device) under control of the processor.

According to a fourth aspect, a computer readable storage medium is provided. The computer readable storage medium stores program code used to search for an entity. The program code includes an instruction used to perform the method described in the first aspect.

With implementation of the embodiments of the present invention, a prior-art problem that a result search has a relatively low matching rate, relatively low accuracy, or the like due to a conceptual gap can be resolved.

BRIEF DESCRIPTION OF DRAWINGS

To describe the technical solutions in the embodiments of the present invention or in the prior art more clearly, the following briefly describes the accompanying drawings required for describing the embodiments or the prior art.

DESCRIPTION OF EMBODIMENTS

The following describes the technical solutions in the embodiments of the present invention in details with reference to the accompanying drawings in the present invention.

Figure 1:
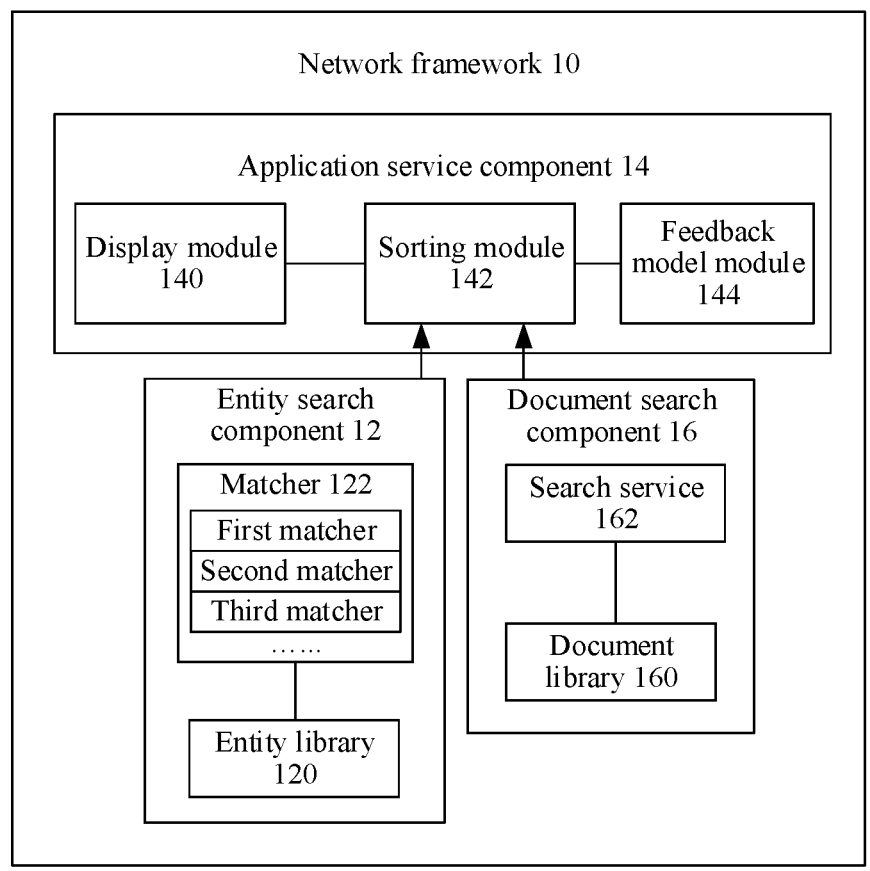
FIG. 1 is a schematic diagram of a network framework according to an embodiment of the present invention.

A schematic diagram of a network framework to which this application is applicable is first described. FIG. 1 is a schematic diagram of a network framework according to an embodiment of the present invention. As shown in FIG. 1, the network framework 100 includes an entity search component 12 and an application service component 14. Optionally, the network framework 100 may further include a document search component 16.

The entity search component 12 includes an entity library 120 and a matcher 122. The entity library 120 includes information about one or more entities. The information about the entity is description information used to describe the entity, for example, a name, an identifier, and attribute information of the entity. Optionally, the entity library 120 may further include information about a relationship between any two entities. Details are described below. The matcher 122 includes one or more matchers. The matcher may be configured to calculate a correlation (that is, a matching degree) between query information entered by a user and the information about the entity in the entity library. Optionally, the calculated correlation may be further fed back to the application service component 14, to subsequently determine, based on the correlation, whether the information about the entity is a search result (a result answer) corresponding to the query information.

The matcher 122 in this application may be designed to include three matchers: a first matcher, a second matcher, and a third matcher. The first matcher is configured to calculate a correlation (that is, a matching degree) between a first classifier (for example, a core word) included in the query information and a third classifier (for example, a core word) included in the information about the entity in the entity library. The second matcher is configured to calculate a correlation between a second classifier (for example, a modifier) included in the query information and the third classifier (for example, a core word) included in the information about the entity in the entity library. Optionally, the second matcher may be further configured to calculate a correlation between the first classifier (for example, a core word) included in the query information and a fourth classifier (for example, a modifier) included in the information about the entity in the entity library. The third matcher is configured to calculate a correlation between the second classifier (for example, a modifier) included in the query information and the fourth classifier (for example, a modifier) included in the information about the entity in the entity library. The first classifier in the query information and the third classifier in the information about the entity belong to a same type/classification, for example, both are corresponding core words used to represent a type of a query result. The second classifier in the query information and the fourth classifier in the information about the entity belong to a same type/classification, for example, both are corresponding modifiers used to modify the type of the query result. Functions of the classifiers (the first classifier and the second classifier) in the query information and the classifiers (the third classifier and the fourth classifier) in the information about the entity, and respective functions (that is, how to calculate a corresponding correlation) of the foregoing three matchers are described in detail below in this application. Details are not described herein.

It should be noted that the foregoing three matchers are merely examples, and do not constitute a limitation. In actual application, functions of the three matchers may be alternatively integrated for implementation in one matcher, or functions of the three matchers may be split for collaborative implementation in a plurality of matchers. For example, the two functions related to the second matcher may be alternatively split for implementation in two matchers. This is not described in detail or limited herein in this application.

The document search component 16 includes a document library 160 and a search service 162. The document library 160 includes one or more documents, and the document library 160 includes a search result corresponding to to-be-queried information. The search service 162 is configured to search the document library for a corresponding search result based on the query information entered by the user, and feed back the search result to the application service component 14. Alternatively, the search service 162 may be configured to calculate a correlation (a matching degree) between the query information entered by the user and each document in the document library, and feed back the correlation to the application service component 14, so that the component 14 determines, based on the correlation, whether the document is a search result corresponding to the query information.

The application service component 14 is configured to display a search result (a result answer) corresponding to the query information, so that a user can view the search result. The application service component 14 may include a display module 140. Optionally, the application service component 14 may further include a sorting module 142 and a feedback model module 144. The display module 140 is configured to display, to the user, the search result corresponding to the query information. The sorting module 142 is configured to sort received correlations in a specified order, for example, sort the received correlations in descending order, so that the display module determines, based on a sorting result in the sorting module, a search result that needs to be displayed. Optionally, the sorting module 142 may further screen/filter the received correlations, for example, filter out a correlation lower than a threshold (for example, 40%).

Using a correlation fed back by the entity search component as an example, the entity search component 12 may feed back a correlation between the query information and information about each entity in the entity library to the application service component 14 (the sorting module 142). Correspondingly, the sorting module may sort, in descending order, correlations that exceed a specific threshold. Further, the display module 142 may sequentially display, to the user according to an arrangement sequence of the sorting module, information (that is, search results) about entities corresponding to the correlations, so that the user can more intuitively and effectively view the search results corresponding to the query information.

The feedback model module 144 may be configured to collect feedback information of the user, where the feedback information may be used to perform re-filtering, sorting, or the like on candidate results (information or documents of candidate entities) found in the entity search component or the document search component, for example, remove a candidate result with poor user feedback or a relatively low click-through rate (view rate). The feedback information may be information fed back by the user in a document form, for example, information about whether a search result corresponding to the query information is appropriate and resolves a related problem; or click-through information of the user, for example, information about whether the user clicks to view a search result corresponding to the query information.

In a product implementation process, the network framework proposed in this application may provide the foregoing function services in a manner of creating a web service (Rest) or an application programming interface (API). The network framework may be deployed in a corresponding terminal device. The terminal device includes but is not limited to a device with a network communication function, for example, user equipment (UE), a server, a mobile phone, a tablet computer, a personal digital assistant (PDA), a mobile Internet device (MID), or a wearable device.

Figure 2:
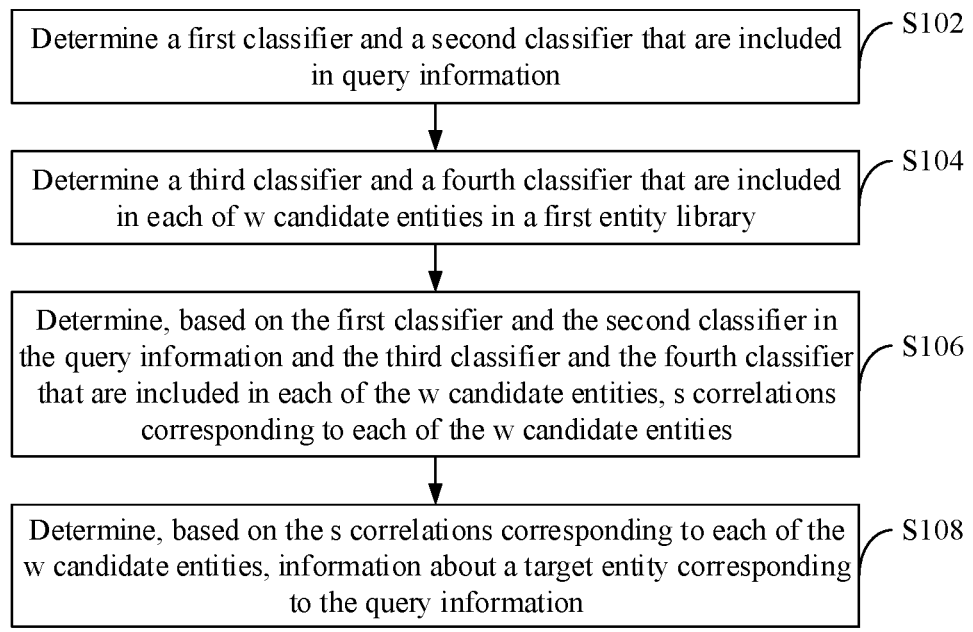
FIG. 2 is a schematic flowchart of an entity search method according to an embodiment of the present invention.

Based on the schematic diagram of the network framework shown in FIG. 1, the following describes related embodiments of an entity search method in this application. FIG. 2 is a schematic flowchart of an entity search method according to an embodiment of the present invention. The entity search method shown in FIG. 2 includes the following implementation steps.

Step S102: A terminal device determines a first classifier and a second classifier that are included in query information, where the first classifier is a word that is in the query information and that represents a type of a query result, and the second classifier is a word other than the first classifier.

In this application, the terminal device may determine a query binary structure included in the query information. The query binary structure includes two (or two types of) classifiers. The query binary structure includes a first classifier and a second classifier. The first classifier may be a word that is in the query information entered by a user and that is used to represent a type of a query result, for example, may be a core word or a keyword. The second classifier may be a word in the query information other than the word used to represent the type of the query result, for example, may be a modifier used to modify/limit the first classifier. A quantity of words included in each of the first classifier and the second classifier is not limited in this application, for example, one or more words may be included. For ease of description, in this application, the following describes related content by using an example in which the first classifier is a core word and the second classifier is a modifier.

For example, the query information entered by the user is: "where is a scene A in a specific TV series taken?" It can be learned that a first classifier in the query information is "where", and second classifiers are the "specific TV series", the "scene A", and "taken".

Step S104: The terminal device determines a third classifier and a fourth classifier that are included in each of w candidate entities in a first entity library, where the third classifier and the first classifier belong to a same classification, the fourth classifier and the second classifier belong to a same classification, and w is a positive integer.

The first entity library includes information about each of the w candidate entities, and w is a positive integer. The information about the candidate entity is description information used to describe the candidate entity, for example, a name, an identifier, and an attribute of the candidate entity. For example, if an entity is "Yao Ming", information about the entity may include attribute information such as a height, a weight, a date of birth, and a residence place of Yao Ming. Optionally, the first entity library may further include relationship information, and the relationship information is information used to describe a relationship between any two candidate entities, for example, a relationship that a first candidate entity is a parent node or a child node of a second candidate entity.

The information about the candidate entity includes an entity binary structure of the candidate entity, and the entity binary structure includes two (or two types of) classifiers. The entity binary structure includes a third classifier and a fourth classifier. The third classifier is a word that is in the information about the candidate entity and that is used to represent a type of a search result. The fourth classifier is a word in the information about the candidate entity other than the third classifier, that is, a word other than the word used to describe the type of the search result. To be specific, the third classifier corresponds to the first classifier, and both are words belonging to a same type/classification; and the fourth classifier corresponds to the second classifier, and both are words belonging to a same type/classification.

Step S106: The terminal device determines, based on the first classifier and the second classifier in the query information and the third classifier and the fourth classifier that are included in each of the w candidate entities, s correlations corresponding to each of the w candidate entities, where the correlation is used to indicate a correlation between the classifiers in the query information and the classifiers in the candidate entity, and s is a positive integer less than or equal to 4.

The terminal device may calculate s correlations between the information about the candidate entity and the query information based on a third classifier and a fourth classifier that are included in an entity binary structure of each candidate entity and the first classifier and the second classifier that are included in the query binary structure of the query information, where s is a positive integer. The correlation is used to indicate a correlation between a first target classifier in the candidate entity and a second target classifier in the query information. The first target classifier is the first classifier or the second classifier, and the second target classifier is the third classifier or the fourth classifier in the candidate entity.

For example, the first classifier and the third classifier are core words, the second classifier and the fourth classifier are modifiers, and s is a positive integer less than or equal to 4. The s correlations include any one or more of a first correlation to a fourth correlation. The first correlation is used to indicate a correlation between a core word in the query information and a core word in the candidate entity. The second correlation is used to indicate a correlation between the core word in the query information and a modifier in the candidate entity. The third correlation is used to indicate a correlation between a modifier in the query information and the core word in the candidate entity. The fourth correlation is used to indicate a correlation between the modifier in the query information and the modifier in the candidate entity. How the foregoing four correlations are calculated is described in detail below.

Step S108: The terminal device determines, based on the s correlations corresponding to each of the w candidate entities, information about a target entity corresponding to the query information, where the target entity is an entity in the w candidate entities.

The terminal device may calculate, based on s correlations corresponding to each candidate entity, a target correlation corresponding to the candidate entity. Correspondingly, a target correlation corresponding to each of the w candidate entities may be calculated. Further, a candidate entity corresponding to a target correlation that exceeds a specific threshold (for example, 80%) is selected, based on w target correlations, from w candidate entities corresponding to the w target correlations as a target entity. Then information about the target entity is used as a search result corresponding to the query information. Optionally, the information about the target entity may be further displayed to the user for viewing, or the like. A quantity of target entities is not limited in this application, and there may be one or more target entities. How to calculate the target correlation is described in detail below.

The following describes some specific embodiments and optional embodiments in this application.

In step S102, the terminal device obtains the query information entered by the user. Then the query information may be preprocessed by using an open source tool, to obtain the query binary structure included in the query information. To be specific, the first classifier and the second classifier that are included in the query information are extracted by using the open source tool. For the first classifier and the second classifier, refer to related descriptions in the foregoing embodiment. Details are not described herein again.

The preprocessing includes binary structure identification processing (that is, identification processing on the first classifier and the second classifier). Optionally, the preprocessing may further include but is not limited to any one or a combination of the following processing: word segmentation processing (word division processing), stop word removal processing, semantic extension processing, and the like. Details about the preprocessing are not described herein.

In step S104, the terminal device may obtain the first entity library. The first entity library may be a database predefined on a user side or a system side, and the database includes information about one or more candidate entities. A type of the candidate entity and related information are not limited in this application. For example, the database includes an entity of a movie type, an entity of a clothing type, and an entity of another field or type.

In an optional embodiment, the first entity library is associated with the first classifier in the query information, that is, the first entity library is determined based on the first classifier in the query information. The terminal device may determine, based on the first classifier in the query information, the first entity library corresponding to the first classifier. A type (that is, a classification) to which all candidate entities included in the first entity library belong is the same as a type of an expression corresponding to the first classifier in the query information. For example, if the first classifier is "where" used to represent an address, all the candidate entities included in the first entity library are entities representing an address, or other entities associated with an entity representing an address. In this application, the following describes related content by using an example in which the first entity library includes information about w candidate entities, where w is a positive integer.

Further, the terminal device may preprocess information about each candidate entity in the first entity library by using an open source tool, to obtain a third classifier and a fourth classifier that are included in each candidate entity in the first entity library. For details about the preprocessing, the third classifier, and the fourth classifier, refer to related descriptions in the foregoing embodiment. Details are not described herein again.

In step S106, the terminal device may calculate/determine, based on the third classifier and the fourth classifier that are included in the information about each candidate entity and the first classifier and the second classifier that are included in the query information, s correlations between the information about the candidate entity and the query information, where s is a positive integer less than or equal to 4.

In other words, the terminal device may determine, based on the third classifier and the fourth classifier that are included in each of the w candidate entities and the first classifier and the second classifier that are included in the query information, the s correlations corresponding to each of the w candidate entities.

In this application, by using an example in which a candidate entity includes a third classifier and a fourth classifier, the first classifier and the third classifier are core words, and the second classifier and the fourth classifier are modifiers, the following describes an implementation of S106 in detail (determining, based on the third classifier and the fourth classifier that are included in information about the candidate entity and the first classifier and the second classifier that are included in the query information, s correlations corresponding to the candidate entity).

In some implementations, the s correlations include a first correlation, and the first correlation $p(h_t|h_q)$ is used to indicate a correlation between the first classifier in the query information and the third classifier in the candidate entity, that is, the first correlation is used to indicate a correlation between a core word in the query information and a core word in the candidate entity.

Because the information about the candidate entity included in the first entity library is excessively detailed or specific, a matching success rate is relatively low when word matching is performed by using the first classifier (that is, the core word) in the query information. Therefore, in this application, the information about the candidate entity in the first entity library may be first generalized, and then a generalized first classifier (that is, a core word) of the candidate entity in the first entity library is matched against the third classifier (the core word) in the query information, so that a matching success rate or accuracy of a search can be improved.

The terminal device (which may be a first matcher in a device) may first perform classification (categorization) processing on the information about the w candidate entities included in the first entity library, to obtain w' processed candidate entities in the first entity library. The classification processing is combining candidate entities corresponding to third classifiers that express same or similar word meanings into a processed candidate entity, that is, combining candidate entities with same or similar core words into a processed candidate entity.

Further, the first correlation is calculated by using a third classifier (a core word) in the w' processed candidate entities in the first entity library and the first classifier (the core word) in the query information. The first correlation p(ht|hq) may be calculated by using the following formula (1):

$$p(h_t \mid h_q) = \begin{cases} 1 & \text{if } h_t \text{ is a child node or a descendant node of } h_q \\ \dfrac{1}{|H(h_t)|} & \text{else if } h_t \text{ is a parent node of } h_q \\ \dfrac{1}{|S(h_t)|} & \text{else if } h_t \text{ is a grandparent node of } h_q \\ 0 & \text{otherwise} \end{cases} \quad \text{Formula (1)}$$

where q indicates the query information, t indicates information about the candidate entity (herein also indicates processed information about the candidate entity), $h_i$ indicates a core word (that is, a first classifier or a third classifier) of i, $M_i$ indicates a modifier (that is, a second classifier or a fourth classifier) of i, i=q or t, $|H(h_t)|$ indicates a quantity of child nodes of $h_t$, and $|S(h_t)|$ indicates a quantity of all sub-nodes (including child nodes and descendant nodes) of $h_t$. In this application, the following describes in detail, by using an example, that a parent node, a child node, a grandparent node, and a descendant node each is information about a relationship between any two candidate entities in the first entity library.

Figure 3A:
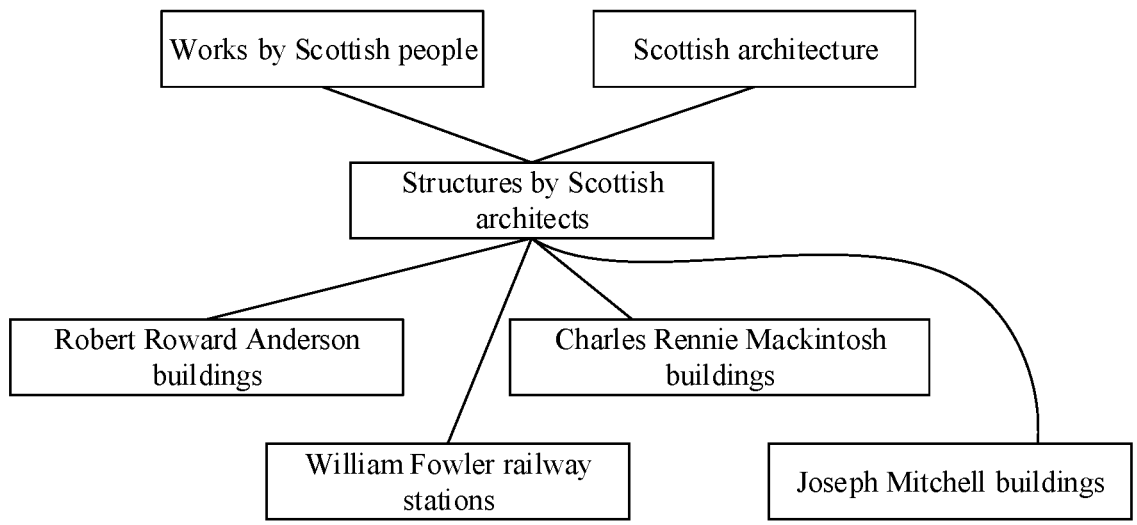
FIG. 3A and FIG. 3B are schematic structural diagrams of two first entity libraries according to an embodiment of the present invention.

For example, FIG. 3A shows a first entity library of a building type. The first entity library includes three layers of node information, and each layer includes one or more nodes (that is, information about one or more candidate entities). As shown in FIG. 3A, a first layer includes information about two candidate entities: works by Scottish people and Scottish architecture; a second layer includes information on one candidate entity: structures by Scottish architects; and a third layer includes information about four candidate entities: Robert Roward Anderson buildings, William Fowler railway stations, Charles Rennie Mackintosh buildings, and Joseph Mitchell buildings. The figure further shows/includes information about a relationship between entities. A node (that is, information about a candidate entity) at an upper layer is a parent node of a node (information about a candidate entity) at a lower layer. On the contrary, a node at a lower layer is a child node of a node at an upper layer. For example, the works by Scottish people at the first layer is a parent node of the structures by Scottish architects at the second layer. In addition, a node above a parent node may be referred to as a grandparent node of a node at a lower layer, and a node below a child node may be referred to as a descendant node of a node at an upper layer. For example, in the figure, the works by Scottish people at the first layer is a grandparent node of the Robert Roward Anderson buildings at the third layer.

Figure 3B:
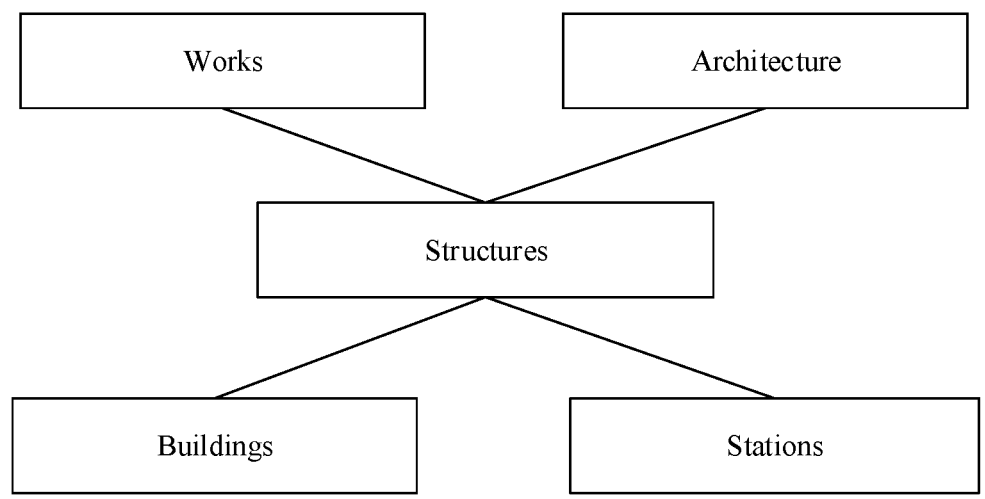

Correspondingly, the terminal device may extract, from the first entity library by using a first matcher (header-header), related nodes associated with the core word in the query information, and combine the related nodes. It is assumed that the related nodes herein are all nodes in FIG. 3A. To implement online construction of the first entity library, a random walk method may be used to extract the related nodes and relationships between the related nodes (which may be lines between the nodes in the figure). Then nodes with a same core word in these nodes are combined (that is, candidate entities with a same core word are combined), to obtain a generalized first entity library. FIG. 3B shows the generalized first entity library. As shown in FIG. 3B, the first entity library also includes three layers of node information. Processed candidate entities (that is, core words of the candidate entities) included in the first layer are works and architecture. A processed candidate entity included in the second layer is structures. Processed candidate entities included in the third layer are buildings and stations.

Further, a first correlation may be calculated by using a core word of a processed candidate entity in the generalized first entity library and the core word in the query information. The first correlation P(ht|hq) may be calculated by using the foregoing formula (1).

For example, the query information entered by the user is works by Charles. It can be learned from S102 that the core word in the query information is works, and the modifier is Charles. Referring to the foregoing examples in FIG. 3A and FIG. 3B, it is assumed that the first entity library shown in FIG. 3A is selected based on the core word in the query information, and the Joseph Mitchell buildings is selected as information about a candidate entity in FIG. 3A, to calculate a first correlation between the core word in the query information and the information about the candidate entity. A core word in the information about the candidate entity is buildings, and modifiers are Joseph and Mitchell. Correspondingly, as described above, the information about the candidate entity in the first entity library shown in FIG. 3A is generalized, to obtain processed information about the candidate entity (a core word of the candidate entity) in the generalized first entity library in FIG. 3B.

It can be learned from FIG. 3B that a corresponding core word of the Joseph Mitchell buildings in the candidate entity in FIG. 3B is buildings. Further, a first correlation between the core word in the query information and the core word in the candidate entity is calculated by using the foregoing formula (1). It can be learned from the foregoing formula (1) and FIG. 3B that the core word buildings ($h_t$) in the candidate entity is a descendant node of the core word Works ($h_q$) in the query information, and therefore the first correlation between the two core words is as follows: $P(h_t|h_q)$=P(buildings|Works)=1.

In some other possible implementations, the s correlations include a second correlation, and the second correlation $p(M_t|h_q)$ is used to indicate a correlation between the first classifier in the query information and the fourth classifier in the candidate entity, that is, indicate a correlation between the core word in the query information and the modifier in the candidate entity. There are the following three implementations.

In a first implementation, the terminal device (which may be a second matcher header-modifier in the device) may perform context association on the fourth classifier (the modifier) in the information about the candidate entity based on a first pre-stored document, to obtain a processed fourth classifier (that is, a processed modifier) in the information about the candidate entity. Further, a correlation a is then calculated based on the first classifier (that is, the core word) in the query information and the processed fourth classifier (that is, the processed modifier) in the candidate entity. Optionally, the correlation a may be used as the second correlation.

The context association may be extracting, from the first pre-stored document, the first i words and/or the last j words of the fourth classifier (the modifier) in the information about the candidate entity, to correspondingly obtain the processed fourth classifier in the information about the candidate entity. i and j are user-defined positive integers on the user side or the system side, and may be the same or different. This is not limited in this application. The first pre-stored document may be a document pre-stored in the terminal device on the user side or the system side, or may be a document obtained from a server side. The document may be a description document related to the query information, or may be a document that describes the candidate entity or the first entity library corresponding to the candidate entity, or the like. This is not described in detail or limited in this application. Correspondingly, a quantity of first pre-stored documents is not limited in this application either.

In an optional embodiment, because there is a relatively large difference between first pre-stored documents, for example, the first classifier (that is, the core word in the query information) appears more frequently in some documents, but the first classifier appears less frequently in some other documents. This easily results in low accuracy for calculating the correlation a. Therefore, in this application, a correlation smoothing algorithm may be further used to calculate the correlation a (or the second correlation) between the first classifier (the core word) in the query information and the processed fourth classifier (that is, the processed modifier) in the candidate entity. The correlation a ($p_a(M_t|h_q)$) may be calculated by using the following formula (2):

$$p_a(M_t | h_q) = \prod_{m \in M_t} p(m | h_q)$$ Formula (2)

$$p(m | h_q) = (1 - \lambda)\frac{n(h_q, m)}{\sum_{w \in ctx(m)} n(w, m)} + \lambda p(h_q | D)$$

where $\lambda$ indicates a probability smoothing factor used in the correlation smoothing algorithm, m indicates a modifier (that is, a fourth classifier) in the candidate entity, $M_t$ indicates all modifiers (or a set of the modifiers) in the candidate entity, D indicates the first pre-stored document, $\Pi$ indicates cumulative multiplication, $n(h_q, m)$ indicates a quantity of times that $h_q$ and the modifier m appear at the same time, w is any word in ctx(m), ctx(m) is a processed modifier obtained by performing context association on the modifier m, or a set including processed modifiers, $h_i$ indicates a core word (a first classifier or a third classifier) of i, $M_i$ indicates a modifier (a second classifier or a fourth classifier) of i, i=q or t, q indicates the query information, and t indicates the information about the candidate entity.

For example, referring to that the query information entered by the user is the works by Charles, and referring to the example in FIG. 3A, the information about the candidate entity is the Joseph Mitchell buildings. Herein, it is assumed that a modifier of the candidate entity (that is, a fourth classifier in the candidate entity) is Mitchell, to calculate a second correlation between the core word in the query information (Works, that is, the first classifier in the query information) and the modifier (Mitchell) in the candidate entity.

It is assumed that there are the following three first pre-stored documents: d1: Mitchell is work by Charles . . . , d2: Joseph Mitchell building . . . , and d3: Mitchell Work . . . . In this case, context association is performed on the modifier (Mitchell) in the candidate entity by using the first pre-stored documents, to obtain a processed modifier: ctx(Mitchell)={work, building, work . . . }. To reduce a degree of a document selection deviation for the first pre-stored documents, in this application, the correlation smoothing algorithm (which may also be referred to as a probability smoothing algorithm) may be used to calculate the second correlation between the core word in the query information and the processed modifier in the entity binary structure of the candidate entity. Details may be shown in the foregoing formula (2).

In this example, assuming that $\lambda=0.5$, $n(h_q, m)=n(work, Mitchell)=2$ may be obtained by using the foregoing formula (2). $\Sigma_w\, n(w, m)$ indicates a quantity of times that all of processed modifiers and the modifier m appear at the same time, and in this example, is 3, that is, a probability that the modifier m and the core word in the query information appear together in the first pre-stored documents is: $n(h_q, m)/\Sigma_w\, n(w, m)=2/3$. $p(hq|D)$ indicates a probability that $h_q$ appears in the first pre-stored documents, and in this example, a probability that work appears is 2/3. Correspondingly, the correlation a is: $p(m|h_q)=p(Mitchell|work)=(1-\lambda) n(h_q, m)/\Sigma_w\, n(w, m)+\lambda p(h_q|D)=(1-0.5)\times 2/3+0.5\times 2/3=1/3$.

In a second implementation, the terminal device (which may be a second matcher in the device) may perform context association on the first classifier (that is, the core word) in the query information based on a first pre-stored document, to obtain a processed first classifier (that is, a processed core word) in the query information. Further, a correlation b is then calculated by using the processed first classifier (that is, the processed core word) in the query information and the fourth classifier in the information about the candidate entity. Optionally, the correlation b may be used as the second correlation. For the context association, refer to related descriptions in the foregoing embodiment. Details are not described herein again.

In an optional embodiment, to reduce a degree of a document selection deviation for the first pre-stored document (that is, improve accuracy for calculating the correlation b), in this application, a correlation smoothing algorithm may also be used to calculate the correlation b. The correlation b ($p_b(M_t|h_q)$) may be calculated by using the following formula (3):

$$p_b(M_t | h_q) = \prod_{m \in M_t} p(m | h_q)$$ Formula (3)

$$p(m | h_q) = (1 - \lambda)\frac{n(h_q, m)}{\sum_{w \in ctx(h_q)} n(w, m)} + \lambda p(h_q | D)$$

where $ctx(h_q)$ is a processed core word obtained by performing context association on the core word $h_q$, or a set including processed core words. For meanings of other parameters in the formula (3), refer to related descriptions in the foregoing formula (2). Details are not described herein again.

For example, referring to the example shown in the first implementation, context association is performed on the core word in the query information (Work, that is, the first classifier in the query information) by using the first pre-stored document, to obtain a processed core word: ctx (Work)={Mitchell, Charles, Mitchell}. In this case, the correlation b may be: $p(m|hq)=p(Mitchell|work)=(1-\lambda)n(hq, m)/\Sigma_{w \in}ctx(hq)\, n(w, m)+\lambda p(hq|D)=(1-0.5)\times 2/3+0.5\times 2/3=1/3$.

In a third implementation, after calculating a correlation a and a correlation b by using the first and second implementations, the terminal device may process the correlation a and the correlation b according to a specified operation rule, to obtain the second correlation. The specified operation rule is a user-defined operation rule on the user side or the system side, for example, addition, subtraction, division, multiplication, or obtaining a maximum value. This is not limited in this application. For example, if the operation rule is set to the operation rule of obtaining a maximum value, the second correlation=the correlation a∨the correlation b=$p_a(M_t|h_q) \vee p_b(M_t|h_q)$.

In some other possible embodiments, the s correlations include a third correlation, and the third correlation $p(h_t|M_q)$ is used to indicate a correlation between the second classifier (the modifier) in the query information and the third classifier (the core word) in the information about the candidate entity, that is, indicate a correlation between the modifier in the query information and the core word in the information about the candidate entity. There are the following three implementations.

In a first implementation, the terminal device (which may be a second matcher in the device) may perform context association on the second classifier (the modifier) in the query information based on a second pre-stored document, to obtain a processed third classifier (that is, a processed modifier) in the query information. Further, a correlation c is calculated by using the processed second classifier (that is, the processed modifier) in the query information and the third classifier (the core word) in the information about the candidate entity. Optionally, the correlation c may be used as the third correlation.

The context association may be extracting, from the second pre-stored document, the first k words and/or the last l words close to the second classifier in the query information. k and l may be user-defined positive integers on the user side or the system side. In this application, both the first pre-stored document and the second pre-stored document are user-defined documents on the user side or the system side, and may be the same or may be different. j, k, and l may be user-defined positive integers on the user side or the system side, and may be the same or different. This is not limited in this application. For the context association and the second pre-stored document, refer to related descriptions in the foregoing embodiment. Details are not described herein again.

In an optional embodiment, to reduce a degree of a document selection deviation for the second pre-stored document (that is, improve accuracy for calculating the correlation c), in this application, a correlation smoothing algorithm may also be used to calculate the correlation c. The correlation c ($p_c(h_t|M_q)$) may be calculated by using the following formula (4):

$$p_c(M_t|h_q) \propto p_1(M_q|h_t) = \prod_{m \in M_q} p(m|h_t) \qquad \text{Formula (4)}$$

$$p(m|h_t) = (1-\lambda)\frac{n(h_t, m)}{\sum_{w \in ctx(m)} n(w, m)} + \lambda p(h_t|D)$$

where λ indicates a probability smoothing factor used in the correlation smoothing algorithm, m indicates a modifier (that is, a second classifier) in the query information, $M_q$ indicates all modifiers (or a set of the modifiers) in the query information, D indicates the second pre-stored document, Π indicates cumulative multiplication, $n(h_t, m)$ indicates a quantity of times that $h_t$ and the modifier m appear at the same time, w is any word in ctx(m), ctx(m) is a processed modifier obtained by performing context association on the modifier m, or a set including processed modifiers, $h_i$ indicates a core word (a first classifier or a third classifier) of i, $M_i$ indicates a modifier (a second classifier or a fourth classifier) of i, i=q or t, q indicates the query information, t indicates the information about the candidate entity, and ∝ indicates a proportional relationship. Optionally, in this application, $p(h_t|M_q)$ may be alternatively considered to be the same as $p(M_q|h_t)$. This is not limited in this application.

For example, referring to the example of the foregoing formula (2), context association is performed on the modifier Charles in the query information, to obtain ctx (Charles)= {work}. Correspondingly, the correlation c may be:

$$p_1(h_t|M_q) \propto p_1(M_q|h_t) = p(m|h_t)$$
$$= p(\text{Charles}|\text{building})$$
$$= (1-\lambda)n(h_t, m) / \sum_w n(w, m) + \lambda p(h_t|D)$$
$$= (1-0.5) \times 0 + 0.5 \times 0$$
$$= 0$$

In a second implementation, the terminal device (which may be a second matcher in the device) may perform context association on the third classifier (the core word) in the information about the candidate entity based on a second pre-stored document, to obtain a processed third classifier (that is, a processed core word) in the information about the candidate entity. Further, a correlation d is calculated by using the second classifier (the modifier) in the query information and the processed third classifier in the information about the candidate entity. Optionally, the correlation d may be used as the third correlation.

In an optional embodiment, to reduce a degree of a document selection deviation for the second pre-stored document (that is, improve accuracy for calculating the correlation d), in this application, a correlation smoothing algorithm may also be used to calculate the correlation d. The correlation d ($p_d(h_t|M_q)$) may be calculated by using the following formula (5):

$$p_d(h_t|M_q) \propto p(M_q|h_t) = \prod_{m \in M_q} p(m|h_t) \qquad \text{Formula (5)}$$

$$p(m|h_t) = (1-\lambda)\frac{n(h_t, m)}{\sum_{w \in ctx(h_t)} n(w, m)} + \lambda p(h_t|D)$$

where $ctx(h_t)$ is a processed core word obtained by performing context association on the core word $h_t$, or a set including processed core words. For meanings of other parameters in the formula (5), refer to related descriptions in the foregoing formula (4). Details are not described herein again.

For example, referring to the example shown in the first implementation, context association is performed on the core word (buildings, that is, the third classifier) in the information about the candidate entity by using the second pre-stored document, to obtain a processed core word: ctx(buildings)={Mitchell}. In this case, the correlation d is: $p_d(h_t|M_q) \propto p(M_q|h_t)$=p(m|ht)=p(Charles|building)=(1−λ)n (ht, m)/Σw n(w, m)+λ p(ht|D)=(1−0.5)×0+0.5×0=0.

In a third implementation, after calculating a correlation c and a correlation d by using the first and second implementations, the terminal device may process the correlation c and the correlation d according to a specified operation rule, to obtain the third correlation. The specified operation rule is a user-defined operation rule on the user side or the system side, for example, addition, subtraction, division, multiplication, or obtaining a maximum value. This is not limited in this application. For example, if the operation rule is set to the operation rule of obtaining a maximum value, the third correlation=the correlation c∨the correlation d=$p_c$ $(h_t|M_q)\vee p_d(h_t|M_q)$.

In some other embodiments, the s correlations include a fourth correlation, and the fourth correlation $p(M_t|M_q)$ is used to indicate a correlation between the second classifier (the modifier) in the query information and the fourth classifier (the modifier) in the information about the candidate entity, that is, indicate a correlation between the modifier in the query information and the modifier in the candidate entity. There are the following three implementations.

In a first implementation, the terminal device (which may be a third matcher in the device) may extend the second classifier (the modifier) in the query information, for example, extend an attribute word for the second classifier, to obtain a processed second classifier (that is, a processed modifier) in the query information. Then a correlation e is calculated by using the processed second classifier (the processed modifier) in the query information and the fourth classifier (the modifier) in the information about the candidate entity. Optionally, the correlation e may be used as the fourth correlation. The correlation e ($p_e(M_t|M_q)$) may be calculated by using the following formula (6):

$$p_e(M_t | M_q) \approx p(M_t | M_e) \qquad \text{Formula (6)}$$
$$= \sum_{m \in M_e} p(M_t | m)$$
$$= \sum_{m \in M_e} \frac{n(m, w)}{\sum_{w_i \in M_e, w_j \in M_t} n(w_i, w_j)}$$

where w and $w_i$ are any words in $M_q$, $w_j$ is any word in $M_t$, $M_e$ indicates all extended modifiers (that is, a set of the modifiers) in the information about the candidate entity, m is any word in $M_e$, $M_q$ indicates all modifiers (or a set of the modifiers, also considered as $M_e$ herein) in the query information, $M_t$ indicates all modifiers (or a set of the modifiers) in the information about the candidate entity, n(m, w) indicates a quantity of times that the modifiers m and w appear at the same time, the modifiers m and w are the same, $n(w_i, w_j)$ indicates a quantity of times that the modifiers $w_i$ and $w_j$ appear at the same time, $h_i$ indicates a core word (a first classifier or a third classifier) of i, $M_i$ indicates a modifier (a second classifier or a fourth classifier) of i, i=q or t, q indicates the query information, and t indicates the information about the candidate entity.

For example, referring to the foregoing example in which the query information is the works by Charles, the modifier in the query information is Charles. In this case, the terminal device may extend an attribute word for the modifier Charles in the query information by using the third matcher, to obtain an extended modifier in the query information. For example, the first entity library herein includes a description of attribute information of Charles, for example, Scottish male architect and Mitchell building's architect. Correspondingly, the extended modifier for Charles is: Me={Scottish, male, Mitchell}.

Further, a correlation e between $M_e$ and the modifier Mitchell in the candidate entity is calculated based on $M_e$ and the modifier Mitchell in the candidate entity. pe(Mt|Mq) may be represented by p(Mt|Me), that is, p({Joseph, Mitchell} {Scottish, male, Mitchell})=n(Mitchell, Mitchell)/Σn(wi, wj)=⅙.

In a second implementation, the terminal device (which may be a third matcher in the device) may extend the fourth classifier (the modifier) in the information about the candidate entity, for example, extend an attribute word for the fourth classifier, to correspondingly obtain a processed fourth classifier (that is, a processed modifier) in the candidate entity. Further, a correlation f is then calculated by using the second classifier (the modifier) in the query information and the processed fourth classifier (the processed modifier) in the candidate entity. Optionally, the correlation f may be used as the fourth correlation.

The correlation f ($p_f(M_t|M_q)$) may be calculated by using the following formula (7):

$$p_f(M_t | M_q) \approx p(M_e | M_q) \qquad \text{Formula (7)}$$
$$= \sum_{m \in M_e} p(m | M_q)$$
$$= \sum_{m \in M_e} \frac{n(m, w)}{\sum_{w_i \in M_q, w_j \in M_t} n(w_i, w_j)}$$

where w and $w_i$ are any words in $M_q$, $w_j$ is any word in $M_t$, $M_e$ indicates all extended modifiers (that is, a set of the modifiers) in the information about the candidate entity, m is any word in $M_e$, $M_q$ indicates all modifiers (or a set of the modifiers) in the query information, $M_t$ indicates all modifiers (or a set of the modifiers, also considered as $M_e$ herein) in the information about the candidate entity, n(m, w) indicates a quantity of times that the modifiers m and w appear at the same time, the modifiers m and w are the same, $n(w_i, w_j)$ indicates a quantity of times that the modifiers $w_i$ and $w_j$ appear at the same time, $h_i$ indicates a core word (a first classifier or a third classifier) of i, $M_i$ indicates a modifier (a second classifier or a fourth classifier) of i, i=q or t, q indicates the query information, and t indicates the information about the candidate entity.

For example, in the example of the foregoing formula (6), the information about the candidate entity is the Joseph Mitchell buildings. Herein, it is assumed that a modifier of the candidate entity (that is, a fourth classifier in the candidate entity) is Mitchell, to calculate a fourth correlation between the modifier in the query information (Charles, that is, the second classifier in the query information) and the modifier (Mitchell) in the candidate entity. In this example, an extended modifier for Mitchell is: $M_e$={Joseph}. In this case, the correlation f is $p_f(M_t|M_q)$, and may be represented by p(Me|Mq): p({Joseph}|{Joseph, Mitchell})=n(Joseph, Joseph)/Σn(wi, wj)=½.

In a third implementation, after calculating a correlation e and a correlation f by using the foregoing first and second implementations, the terminal device may process the correlation e and the correlation f according to a specified operation rule, to obtain the fourth correlation. The specified operation rule is a user-defined operation rule on the user side or the system side, for example, addition, subtraction, division, multiplication, or obtaining a maximum value. This is not limited in this application. For example, if the operation rule is set to the operation rule of obtaining a maximum value, the fourth correlation=the correlation e√/the correlation f=$p_e(M_t| M_q)\vee p_f(M_t|M_q)$.

It should be noted that, according to the illustration principles of the foregoing specific implementations of S106, the terminal device may calculate, based on a third classifier and a fourth classifier in each candidate entity and the first classifier and the second classifier in the query information, s correlations corresponding to each candidate entity. Details are not described herein again.

Correspondingly, in step S108, after obtaining the s correlations corresponding to each candidate entity, the terminal device may process, according to a specified operation rule, the s correlations corresponding to the candidate entity, to obtain a target correlation corresponding to the candidate entity. The specified operation rule is a user-defined operation rule on the user side or the system side, for example, a multiplication operation, an addition operation, or a power multiplication operation. For another example, a correlation with a largest value may be selected from the s correlations as the target correlation. This is not limited in this application.

For example, using an example in which the s correlations include a first correlation $p(h_t|h_q)$, a second correlation $p(M_t|h_q)$, a third correlation $p(h_t|M_q)$, and a fourth correlation $p(M_t|M_q)$, the terminal device may calculate, by using the following formula (8), the target correlation p(q|t) corresponding to the candidate entity.

$$p(q|t)=p(h_t|h_q)^{\alpha 1} \times p(M_t|h_q)^{\alpha 2} \times p(h_t|M_q)^{\alpha 3} \times p(M_t|M_q)^{\alpha 4} \quad \text{Formula (8)}$$

where the target correlation p(q|t) is used to indicate a correlation between the information t about the candidate entity and the query information q, a value of $\alpha_j$ (j=1, 2, 3, or 4) ranges from 0 to 1, and $\alpha_j$ indicates a weight of a $j^{th}$ correlation in the candidate entity relative to the whole (s correlations). A larger value of $\alpha_j$ indicates a heavier weight. When correlations of some classifiers are not considered, a corresponding value of $\alpha_j$ is 0. Details are not described in this application.

Further, after calculating the target correlation corresponding to each of the w candidate entities, the terminal device may select information about a target entity based on w target correlations, and use the information as a search result corresponding to the query information. The target correlation is used to indicate a correlation between a candidate entity (that is, information about the candidate entity) and the query information. The target entity is one or more entities in the w candidate entities.

In an optional embodiment, the target entity is an entity that is in the w candidate entities and that corresponds to a target correlation exceeding a preset first threshold. In specific implementation, the terminal device may directly select, from the w candidate entities based on the w target correlations corresponding to the w candidate entities, a candidate entity corresponding to a target correlation that exceeds the preset first threshold as the target entity. Alternatively, the terminal device may sort, in a preset order, the w target correlations corresponding to the w candidate entities. For example, the terminal device sorts the w target correlations in descending order of the target correlations, then selects the first m target correlations with a highest target correlation, and uses m candidate entities corresponding to the m target correlations as the target entity. m is a user-defined positive integer on the user side or system side, for example, 1 or 5.

Correspondingly, the terminal device may use information about the selected candidate entity (that is, information about the target entity) as a search result corresponding to the query information. Optionally, the information about the target entity may be further displayed to the user for viewing.

With implementation of the embodiments of the present invention, a prior-art problem that a matching rate or accuracy of a search is relatively low, or the like due to a conceptual gap can be resolved, thereby improving a matching success rate and accuracy of a search.

The foregoing mainly describes the solutions provided in the embodiments of the present invention from a perspective of the terminal device. It may be understood that, to implement the foregoing functions, the terminal device includes corresponding hardware structures and/or software modules for performing the functions. With reference to the units and algorithm steps described in the embodiments disclosed in the present invention, embodiments of the present invention can be implemented in a form of hardware or hardware and computer software. Whether a function is performed by hardware or hardware driven by computer software depends on particular applications and design constraints of the technical solutions. A person skilled in the field may use different methods to implement the described functions for each particular application, but it should not be considered that the implementation falls beyond the scope of the technical solutions in the present invention.

In the embodiments of the present invention, the terminal device may be divided into function units based on the foregoing method examples. For example, each function unit may be obtained through division based on a corresponding function, or two or more functions may be integrated into one processing unit. The integrated unit may be implemented in a form of hardware, or may be implemented in a form of a software functional unit. It should be noted that, in this embodiment of the present invention, unit division is exemplary, and is merely a logical function division. In actual implementation, another division manner may be used.

Figure 4:
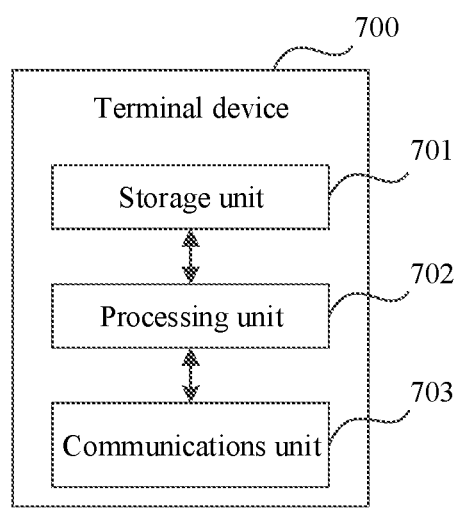
FIG. 4 is a schematic structural diagram of a terminal device according to an embodiment of the present invention.

In a case in which an integrated unit is used, FIG. 4 is a possible schematic structural diagram of the terminal device in the foregoing embodiments. The terminal device 700 includes a processing unit 702 and a communications unit 703. The processing unit 702 is configured to control and manage an action of the terminal device 700. The processing unit 702 is configured to support the terminal device 700 in performing steps S102 to S108 in FIG. 2, and/or is configured to perform other steps of the technology described in this specification. The communications unit 703 is configured to support communication between the terminal device 700 and another device, for example, support communication with a server to obtain information about w candidate entities included in a first entity library, and/or is configured to perform other steps of the technology described in this specification.

The terminal device 700 may further include a storage unit 701, configured to store program code and data of the terminal device 700.

The processing unit 702 may be a processor or a controller, such as a central processing unit (CPU), a general-purpose processor, a digital signal processor (DSP), an application-specific integrated circuit (ASIC), a field programmable gate array (FPGA), or another programmable logical device, a transistor logical device, a hardware component, or any combination thereof. The controller/processor may implement or execute various example logical blocks, modules, and circuits described with reference to content disclosed in the present invention. The processor may be a combination of processors implementing a computing function, for example, a combination of one or more microprocessors, or a combination of the DSP and a microprocessor. The communications unit 703 may be a communications interface, a transceiver, a transceiver circuit, or the like. The communications interface is a collective name, and may include one or more interfaces, for example, an interface between the terminal device and another device. The storage unit 701 may be a memory.

Figure 5:
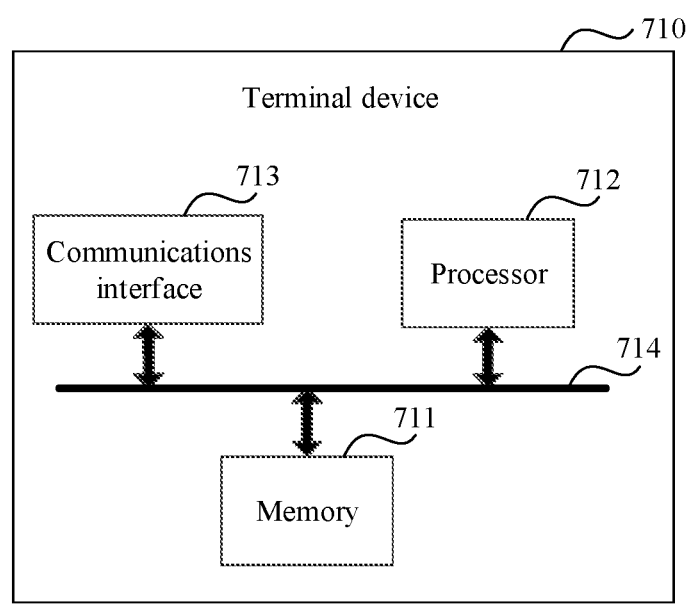
FIG. 5 is a schematic structural diagram of another terminal device according to an embodiment of the present invention.

When the processing unit 702 is a processor, the communications unit 703 is a communications interface, and the storage unit 701 is a memory, the terminal device in this embodiment of the present invention may be a terminal device shown in FIG. 5.

As shown in FIG. 5, a network device 710 includes a processor 712, a communications interface 713, and a memory 77. Optionally, the terminal device 710 may further include a bus 714. The communications interface 713, the processor 712, and the memory 77 may be connected to each other by using the bus 714. The bus 714 may be a peripheral component interconnect (PCI) bus, an extended industry standard architecture (EISA) bus, or the like. The bus 714 may be classified into an address bus, a data bus, a control bus, and the like. For ease of representation, only one thick line is used to represent the bus in FIG. 5, but this does not mean that there is only one bus or only one type of bus.

Optionally, the terminal device shown in FIG. 4 and FIG. 5 may further include a display unit, and the display unit may be a display screen, which is not shown in the figure. The display screen is configured to display a search result (information about a target entity).

For specific implementation of the terminal device shown in FIG. 4 or FIG. 5, refer to corresponding descriptions in the foregoing method embodiments. Details are not described herein again.

Methods or algorithm steps described in combination with the content disclosed in this embodiment of the present invention may be implemented by hardware, or may be implemented by a processor by executing a software instruction. The software instruction may include a corresponding software module. The software module may be stored in a random access memory (RAM), a flash memory, a read only memory (ROM), an erasable programmable read only memory (EPROM), an electrically erasable programmable read only memory (EEPROM), a register, a hard disk, a mobile hard disk, a compact disc read-only memory (CD-ROM), or any other form of storage medium well-known in the art. For example, a storage medium is coupled to a processor, so that the processor can read information from the storage medium or write information into the storage medium. Certainly, the storage medium may be a component of the processor. The processor and the storage medium may be located in the ASIC. In addition, the ASIC may be located in network equipment. Certainly, the processor and the storage medium may exist in the terminal device as discrete components.

A person of ordinary skill in the art may understand that all or some of the processes of the methods in the embodiments may be implemented by a computer program instructing relevant hardware. The program may be stored in a computer readable storage medium. When the program runs, the processes of the methods in the embodiments are performed. The foregoing storage medium includes: any medium that can store program code, such as a ROM, a RAM, a magnetic disk, or an optical disc.

What is claimed is:

1. An entity search method applied to a terminal device, the method comprising:

determining a first classifier and a second classifier that are comprised in query information, wherein the first classifier is a word that is in the query information and that represents a type of a query result, and the second classifier is a word in the query information other than the first classifier;

determining, based on a first entity library and the first classifier and the second classifier that are comprised in the query information, s correlations corresponding to each of w candidate entities, wherein the first entity library comprises information about each of the w candidate entities, the information about each candidate entity comprises a third classifier and a fourth classifier, the third classifier and the first classifier belong to a same classification, the fourth classifier and the second classifier belong to a same classification, each of the s correlations indicates a correlation between a classifier in the query information and a classifier in the candidate entity, both w and s are positive integers, and s is less than or equal to 4;

determining, based on the s correlations corresponding to each of the w candidate entities, information about a target entity corresponding to the query information, wherein the target entity is an entity in the w candidate entities; and wherein the first classifier comprises a corresponding core word that is in the query information and that represents the type of the query result, and the second classifier comprises a modifier in the query information other than the first classifier and a stop word.

2. The method according to claim 1, wherein the s correlations comprise a first correlation which indicates a correlation between the first classifier in the query information and the third classifier in the candidate entity; and wherein determining the s correlations corresponding to each of w candidate entities comprises:

performing classification processing on the w candidate entities in the first entity library, to obtain a processed candidate entity, wherein the classification processing comprises combining candidate entities corresponding to third classifiers that express same or similar word meanings into a processed candidate entity; and determining, based on the first classifier in the query information and a third classifier in the processed candidate entity, a first correlation corresponding to each of the w candidate entities.

3. The method according to claim 1, wherein the s correlations comprise a second correlation which indicates a correlation between the first classifier in the query information and the fourth classifier in the candidate entity; and wherein determining the s correlations corresponding to each of w candidate entities comprises any one of the following:

determining, based on a processed first classifier in the query information and the fourth classifier comprised in each of the w candidate entities, a correlation a corresponding to each of the w candidate entities, and using the correlation a as a second correlation corresponding to each of the w candidate entities;

determining, based on the first classifier in the query information and a processed fourth classifier comprised in each of the w candidate entities, a correlation b corresponding to each of the w candidate entities, and using the correlation b as a second correlation corresponding to each of the w candidate entities;

determining, based on a correlation a corresponding to each of the w candidate entities and a correlation b corresponding to each of the w candidate entities, a second correlation corresponding to each of the w candidate entities; and wherein the processed first classifier is obtained by performing context association processing on the first classifier in the query information based on a first pre-stored document, the processed fourth classifier is obtained by performing, based on the first pre-stored document, context association processing on the fourth classifier comprised in the candidate entity, wherein the context association processing comprises extracting, from the first pre-stored document, the first i words and/or the last j words that are close to the first classifier or the fourth classifier, and both i and j are positive integers.

4. The method according to claim 3, wherein the correlation a or the correlation b is determined based on a correlation smoothing algorithm, and the correlation smoothing algorithm is used to reduce a degree of a deviation, in the first pre-stored document, of the first classifier in the query information or the fourth classifier in the candidate entity.

5. The method according to claim 1, wherein the s correlations comprise a third correlation which indicates a correlation between the second classifier in the query information and the third classifier in the candidate entity; and wherein determining the s correlations corresponding to each of w candidate entities comprises any one of the following:

determining, based on a processed second classifier in the query information and the third classifier comprised in each of the w candidate entities, a correlation c corresponding to each of the w candidate entities, and using the correlation c as a third correlation corresponding to each of the w candidate entities;

determining, based on the second classifier in the query information and a processed third classifier comprised in each of the w candidate entities, a correlation d corresponding to each of the w candidate entities, and using the correlation d as a third correlation corresponding to each of the w candidate entities;

determining, based on a correlation c corresponding to each of the w candidate entities and a correlation d corresponding to each of the w candidate entities, a third correlation corresponding to each of the w candidate entities; and wherein the processed second classifier is obtained by performing context association processing on the second classifier in the query information based on a second pre-stored document, the processed third classifier is obtained by performing, based on the second pre-stored document, context association processing on the third classifier comprised in the candidate entity, wherein the context association processing comprises extracting, from the second pre-stored document, the first k words and/or the last l words that are close to the second classifier or the third classifier, and both k and l are positive integers.

6. The method according to claim 5, wherein the correlation c or the correlation d is determined based on a correlation smoothing algorithm, and the correlation smoothing algorithm is used to reduce a degree of a deviation, in the second pre-stored document, of the second classifier in the query information or the third classifier in the candidate entity.

7. The method according to claim 1, wherein the s correlations comprise a fourth correlation which indicates a correlation between the second classifier in the query information and the fourth classifier in the candidate entity; and wherein determining the s correlations corresponding to each of w candidate entities comprises any one of the following:

determining, based on an extended second classifier in the query information and the fourth classifier comprised in each of the w candidate entities, a correlation e corresponding to each of the w candidate entities, and using the correlation e as a fourth correlation corresponding to each of the w candidate entities;

determining, based on the second classifier in the query information and an extended fourth classifier comprised in each of the w candidate entities, a correlation f corresponding to each of the w candidate entities, and using the correlation f as a fourth correlation corresponding to each of the w candidate entities;

determining, based on a correlation e corresponding to each of the w candidate entities and a correlation f corresponding to each of the w candidate entities, a fourth correlation corresponding to each of the w candidate entities; and wherein the extended second classifier is obtained by extending an attribute word for the second classifier in the query information, and the extended fourth classifier is obtained by extending an attribute word for the fourth classifier in the candidate entity.

8. The method according to claim 1, wherein determining the information about the target entity corresponding to the query information comprises:

determining, based on the s correlations corresponding to each of the w candidate entities, a target correlation corresponding to each of the w candidate entities; and determining, based on the target correlation corresponding to each of the w candidate entities, the information about the target entity corresponding to the query information, wherein the target entity is a corresponding entity that is in the w candidate entities and that has a target correlation greater than or equal to a first threshold.

9. A terminal device comprising:

a memory storing instructions; and at least one processor coupled to the memory, wherein the instructions, when executed by the at least one processor, cause the at least one processor to perform operations comprising:

determining a first classifier and a second classifier that are comprised in query information, wherein the first classifier is a word that is in the query information and that represents a type of a query result, and the second classifier is a word in the query information other than the first classifier;

determining, based on a first entity library and the first classifier and the second classifier that are comprised in the query information, s correlations corresponding to each of w candidate entities, wherein the first entity library comprises information about each of the w candidate entities, the information about the candidate entity comprises a third classifier and a fourth classifier, the third classifier and the first classifier belong to a same classification, the fourth classifier and the second classifier belong to a same classification, each of the s correlations indicates a correlation between a classifier in the query information and a classifier in the candidate entity, both w and s are positive integers, and s is less than or equal to 4;

determining, based on the s correlations corresponding to each of the w candidate entities, information about a target entity corresponding to the query information, wherein the target entity is an entity in the w candidate entities; and wherein the first classifier comprises a corresponding core word that is in the query information and that represents the type of the query result, and the second classifier comprises a modifier in the query information other than the first classifier and a stop word.

10. The terminal device according to claim 9, wherein the s correlations comprise a first correlation which indicates a correlation between the first classifier in the query information and the third classifier in the candidate entity; and wherein determining the s correlations corresponding to each of w candidate entities comprises:

performing classification processing on the w candidate entities in the first entity library, to obtain a processed candidate entity, wherein the classification processing comprises combining candidate entities corresponding to third classifiers that express same or similar word meanings into a processed candidate entity; and determining, based on the first classifier in the query information and a third classifier in the processed candidate entity, a first correlation corresponding to each of the w candidate entities.

11. The terminal device according to claim 9, wherein the s correlations comprise a second correlation which indicates a correlation between the first classifier in the query information and the fourth classifier in the candidate entity; and wherein determining the s correlations corresponding to each of w candidate entities comprises any one of the following:

determining, based on a processed first classifier in the query information and the fourth classifier comprised in each of the w candidate entities, a correlation a corresponding to each of the w candidate entities, and using the correlation a as a second correlation corresponding to each of the w candidate entities;

determining, based on the first classifier in the query information and a processed fourth classifier comprised in each of the w candidate entities, a correlation b corresponding to each of the w candidate entities, and using the correlation b as a second correlation corresponding to each of the w candidate entities;

determining, based on a correlation a corresponding to each of the w candidate entities and a correlation b corresponding to each of the w candidate entities, a second correlation corresponding to each of the w candidate entities; and wherein the processed first classifier is obtained by performing context association processing on the first classifier in the query information based on a first pre-stored document, the processed fourth classifier is obtained by performing, based on the first pre-stored document, context association processing on the fourth classifier comprised in the candidate entity, wherein the context association processing comprises extracting, from the first pre-stored document, the first i words and/or the last j words that are close to the first classifier or the fourth classifier, and both i and j are positive integers.

12. The terminal device according to claim 9, wherein the correlation a or the correlation b is determined based on a correlation smoothing algorithm, and the correlation smoothing algorithm is used to reduce a degree of a deviation, in the first pre-stored document, of the first classifier in the query information or the fourth classifier in the candidate entity.

13. The terminal device according to claim 9, wherein the s correlations comprise a third correlation which indicates a correlation between the second classifier in the query information and the third classifier in the candidate entity; and wherein determining the s correlations corresponding to each of w candidate entities comprises any one of the following:

determining, based on a processed second classifier in the query information and the third classifier comprised in each of the w candidate entities, a correlation c corresponding to each of the w candidate entities, and using the correlation c as a third correlation corresponding to each of the w candidate entities;

determining, based on the second classifier in the query information and a processed third classifier comprised in each of the w candidate entities, a correlation d corresponding to each of the w candidate entities, and using the correlation d as a third correlation corresponding to each of the w candidate entities;

determining, based on a correlation c corresponding to each of the w candidate entities and a correlation d corresponding to each of the w candidate entities, a third correlation corresponding to each of the w candidate entities; and wherein the processed second classifier is obtained by performing context association processing on the second classifier in the query information based on a second pre-stored document, the processed third classifier is obtained by performing, based on the second pre-stored document, context association processing on the third classifier comprised in the candidate entity, wherein the context association processing comprises extracting, from the second pre-stored document, the first k words and/or the last l words that are close to the second classifier or the third classifier, and both k and l are positive integers.

14. The terminal device according to claim 9, wherein the correlation c or the correlation d is determined based on a correlation smoothing algorithm, and the correlation smoothing algorithm is used to reduce a degree of a deviation, in the second pre-stored document, of the second classifier in the query information or the third classifier in the candidate entity.

15. The terminal device according to claim 9, wherein the s correlations comprise a fourth correlation which indicates a correlation between the second classifier in the query information and the fourth classifier in the candidate entity; and wherein determining the s correlations corresponding to each of w candidate entities comprises any one of the following:

determining, based on an extended second classifier in the query information and the fourth classifier comprised in each of the w candidate entities, a correlation e corresponding to each of the w candidate entities, and using the correlation e as a fourth correlation corresponding to each of the w candidate entities;

determining, based on the second classifier in the query information and an extended fourth classifier comprised in each of the w candidate entities, a correlation f corresponding to each of the w candidate entities, and using the correlation f as a fourth correlation corresponding to each of the w candidate entities;

determining, based on a correlation e corresponding to each of the w candidate entities and a correlation f corresponding to each of the w candidate entities, a fourth correlation corresponding to each of the w candidate entities; and wherein the extended second classifier is obtained by extending an attribute word for the second classifier in the query information, and the extended fourth classifier is obtained by extending an attribute word for the fourth classifier in the candidate entity.

16. The terminal device according to claim 9, wherein determining the information about the target entity corresponding to the query information comprises:

determining, based on the s correlations corresponding to each of the w candidate entities, a target correlation corresponding to each of the w candidate entities; and determining, based on the target correlation corresponding to each of the w candidate entities, the information about the target entity corresponding to the query information, wherein the target entity is a corresponding entity that is in the w candidate entities and that has a target correlation greater than or equal to a first threshold.

17. The terminal device according to claim 9, further comprising: a display coupled to the at least one processor, and the display is configured to display information about a target entity under control of the at least one processor.

18. A non-transitory computer readable storage medium, storing a computer program, which when executed by a processor of a terminal device, cause the terminal device to perform operations including:

determining a first classifier and a second classifier that are comprised in query information, wherein the first classifier is a word that is in the query information and that represents a type of a query result, and the second classifier is a word in the query information other than the first classifier;

determining, based on a first entity library and the first classifier and the second classifier that are comprised in the query information, s correlations corresponding to each of w candidate entities, wherein the first entity library comprises information about each of the w candidate entities, the information about the candidate entity comprises a third classifier and a fourth classifier, the third classifier and the first classifier belong to a same classification, the fourth classifier and the second classifier belong to a same classification, each of the s correlations indicates a correlation between a classifier in the query information and a classifier in the candidate entity, both w and s are positive integers, and s is less than or equal to 4;

determining, based on the s correlations corresponding to each of the w candidate entities, information about a target entity corresponding to the query information, wherein the target entity is an entity in the w candidate entities; and wherein the first classifier comprises a corresponding core word that is in the query information and that represents the type of the query result, and the second classifier comprises a modifier in the query information other than the first classifier and a stop word.

19. The non-transitory computer readable storage medium according to claim 18, wherein the s correlations comprise a first correlation which indicates a correlation between the first classifier in the query information and the third classifier in the candidate entity; and wherein the operation of determining the s correlations corresponding to each of w candidate entities comprises:

performing classification processing on the w candidate entities in the first entity library, to obtain a processed candidate entity, wherein the classification processing comprises combining candidate entities corresponding to third classifiers that express same or similar word meanings into a processed candidate entity; and determining, based on the first classifier in the query information and a third classifier in the processed candidate entity, a first correlation corresponding to each of the w candidate entities.

20. The non-transitory computer readable storage medium according to claim 18, wherein the s correlations comprise a second correlation which indicates a correlation between the first classifier in the query information and the fourth classifier in the candidate entity; and wherein the operation of determining the s correlations corresponding to each of w candidate entities comprises any one of the following:

determining, based on a processed first classifier in the query information and the fourth classifier comprised in each of the w candidate entities, a correlation a corresponding to each of the w candidate entities, and using the correlation a as a second correlation corresponding to each of the w candidate entities;

determining, based on the first classifier in the query information and a processed fourth classifier comprised in each of the w candidate entities, a correlation b corresponding to each of the w candidate entities, and using the correlation b as a second correlation corresponding to each of the w candidate entities;

determining, based on a correlation a corresponding to each of the w candidate entities and a correlation b corresponding to each of the w candidate entities, a second correlation corresponding to each of the w candidate entities; and wherein the processed first classifier is obtained by performing context association processing on the first classifier in the query information based on a first pre-stored document, the processed fourth classifier is obtained by performing, based on the first pre-stored document, context association processing on the fourth classifier comprised in the candidate entity, wherein the context association processing comprises extracting, from the first pre-stored document, the first i words and/or the last j words that are close to the first classifier or the fourth classifier, and both i and j are positive integers.

* * * * *